US011215027B2

(12) United States Patent
Vick, Jr. et al.

(10) Patent No.: US 11,215,027 B2
(45) Date of Patent: Jan. 4, 2022

(54) SAFETY VALVE WITH A SLEEVED PISTON RECEPTACLE

(71) Applicant: Halliburton Energy Services, Inc., Houston, TX (US)

(72) Inventors: James Dan Vick, Jr., Dallas, TX (US); Andrew James Kelbie, Little Elm, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 52 days.

(21) Appl. No.: 16/475,352

(22) PCT Filed: Jul. 30, 2018

(86) PCT No.: PCT/US2018/044414
§ 371 (c)(1),
(2) Date: Jul. 1, 2019

(87) PCT Pub. No.: WO2020/027782
PCT Pub. Date: Feb. 6, 2020

(65) Prior Publication Data
US 2020/0355043 A1    Nov. 12, 2020

(51) Int. Cl.
*E21B 34/10* (2006.01)
*E21B 34/08* (2006.01)
(52) U.S. Cl.
CPC .............. *E21B 34/10* (2013.01); *E21B 34/08* (2013.01); *E21B 2200/05* (2020.05)

(58) Field of Classification Search
CPC ...... E21B 2200/05; E21B 34/00; E21B 34/06; E21B 34/10; F16K 1/20; F16K 1/2007; F16K 27/0227; F16K 31/46
See application file for complete search history.

(56) References Cited

U.S. PATENT DOCUMENTS

| 2,780,290 A | * | 2/1957 | Natho | E21B 34/16 |
| | | | | 166/72 |
| 3,071,151 A | * | 1/1963 | Sizer | E21B 34/08 |
| | | | | 137/496 |
| 3,782,461 A | * | 1/1974 | Watkins | E21B 34/105 |
| | | | | 166/72 |

(Continued)

OTHER PUBLICATIONS

ISRWO International Search Report and Written Opinion for PCT/US2018/044414 dated Apr. 25, 2019.

*Primary Examiner* — James G Sayre
(74) *Attorney, Agent, or Firm* — Scott Richardson; C. Tumey Law Group PLLC (57) ABSTRACT

Provided are systems and methods incorporating design features that may be beneficial over current available well safety valves, such as a sleeved receptacle for a piston, a constrained piston rod, and a trapped flapper valve. A safety valve may comprise: an outer housing having a central bore extending axially through the outer housing, wherein the outer housing comprises an outer wall having a receptacle formed in the outer wall; a sleeve disposed in the receptacle; a piston disposed in the sleeve, wherein the piston is actuated to travel in the sleeve; a spring positioned to apply a biasing force to the piston; and a valve member disposed in the outer housing, wherein the valve member is operable to selectively restrict flow through the safety valve in response to movement of the piston.

20 Claims, 6 Drawing Sheets

(56) References Cited

U.S. PATENT DOCUMENTS

| | | | |
|---|---|---|---|
| 3,958,633 A * | 5/1976 | Britch | E21B 23/03 |
| | | | 166/117.5 |
| 3,981,358 A | 9/1976 | Watkins et al. | |
| 4,161,219 A | 7/1979 | Pringle | |
| 4,356,867 A | 11/1982 | Carmody | |
| 4,373,587 A * | 2/1983 | Pringle | E21B 34/10 |
| | | | 166/324 |
| 4,624,315 A | 11/1986 | Dickson et al. | |
| 5,249,630 A | 10/1993 | Meaders et al. | |
| 6,854,519 B2 * | 2/2005 | Deaton | E21B 34/10 |
| | | | 166/332.8 |
| 2009/0056948 A1 | 3/2009 | Martin et al. | |
| 2012/0205114 A1 | 8/2012 | Biddick et al. | |
| 2016/0273304 A1 | 9/2016 | Vick, Jr. et al. | |
| 2019/0145188 A1 * | 5/2019 | Johnson | E21B 34/14 |
| | | | 166/321 |

* cited by examiner

SAFETY VALVE WITH A SLEEVED PISTON RECEPTACLE

BACKGROUND

Well safety valves may be installed in a wellbore to prevent uncontrolled release of reservoir fluids. The control line may extend from the valve to the surface to pressurize the TRSV. The TRSV may be run downhole into a wellbore and is part of the production string.

Typically, TRSVs are manufactured from corrosive resistant material as the TRSVs may be exposed to various chemicals and fluids. This is especially for the seal bore and the piston where corrosive pitting can lead to piston seal failure. Without regulatory requirements, the likelihood of installation of TRSVs in completed wellbores may be low due to the overall cost of the TRSV, as the TRSV has to be manufactured from a more expensive material in order to properly operate. Although the TRSV may be an important tool for preventative safety, its use may be restricted due to the high cost associated with its procurement and use.

BRIEF DESCRIPTION OF THE DRAWINGS

These drawings represent certain aspects of the present invention and should not be used to limit or define the disclosure.

DETAILED DESCRIPTION

Provided are systems and methods for decreasing the cost and increasing the efficiency of a TRSV or other suitable well safety valve. Disclosed herein are design features that may be beneficial over current available well safety valves, such as a sleeved receptacle for a piston, a constrained piston rod, and a trapped flapper valve. In examples, a sleeved receptacle may reduce the amount of corrosive resistant material needed in the top sub-assembly of the well safety valve. A constrained piston rod may remove the need for a spring bearing and/or an alignment rod. Further, the trapped flapper valve may allow for the internal components to be assembled as a singular assembly rather than multiple components.

Figure 1:
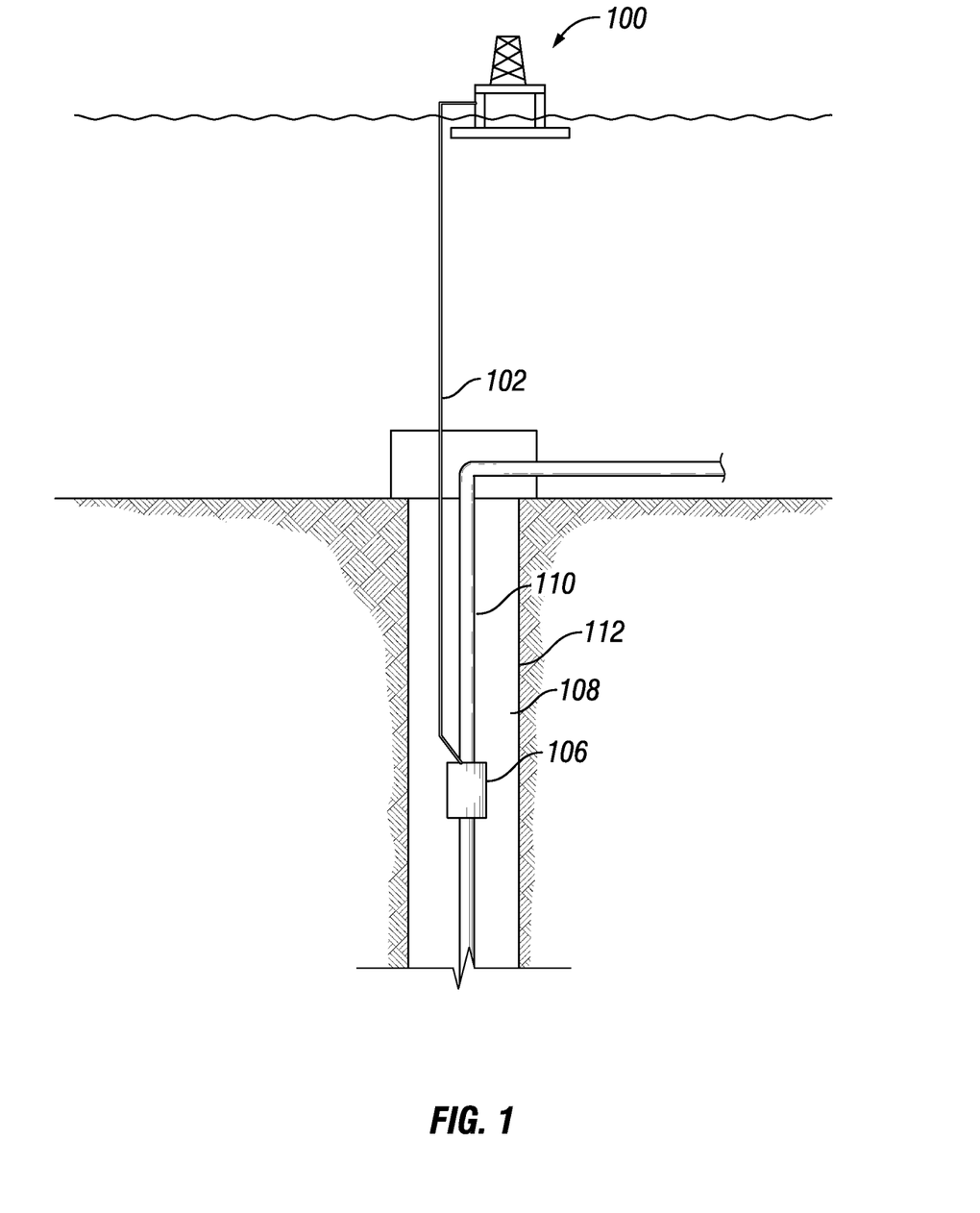
FIG. 1 illustrates an example of a tubing string with a safety valve.

FIG. 1 illustrates an offshore platform 100 connected to a well safety valve 106 via control line 102. An annulus 108 may be defined between walls of well 112 and a conduit 110. Conduit 110 may be any conduit such as a casing, liner, production tubing, tubing string, or other tubulars disposed in a wellbore. In the following description of the safety valve 106 and other apparatus and methods described herein, directional terms, such as "above", "below" "upper", "lower", etc., are used only for convenience in referring to the accompanying drawings. Additionally, it is to be understood that the various examples of the well safety valve described herein may be utilized in various orientations, such as inclined, inverted, horizontal, vertical, etc., and in various configurations, without departing from the principles of the present invention.

Safety valve 106 may be interconnected in conduit 110 and positioned in well 112. In examples, Safety valve 106 may be disposed downhole to seal off conduit 110 from the flow of hydrocarbons. Although well 112, as depicted in FIG. 1, is an offshore well, one of ordinary skill should be able to adopt the teachings herein to any type of well including onshore or offshore. A control line 102 may extend into well 112 and may be connected to safety valve 106. Control line 102 may be used to actuate safety valve 106, for example, to maintain safety valve 106 in an open position and to close the safety valve 106 to prevent a blowout in the event of an emergency.

In an example, control line 102 may be a hydraulic control line providing hydraulic fluid. Pressure may be applied to control line 102 at a remote location, such as a production platform or a subsea control station, to maintain safety valve 106 in an open position. In FIG. 1, pressure may be applied to control line 102 at offshore platform 100. To close Safety valve 106, pressure in control line 102 may be reduced. Although control line 102 is depicted in FIG. 1 as being external to conduit 110, it should be understood that control line 102 may be disposed at any suitable location to convey actuation pressure to safety valve 106. For example, control line 102 may be internal to conduit 110, or formed in a sidewall of conduit 110.

Figure 2:
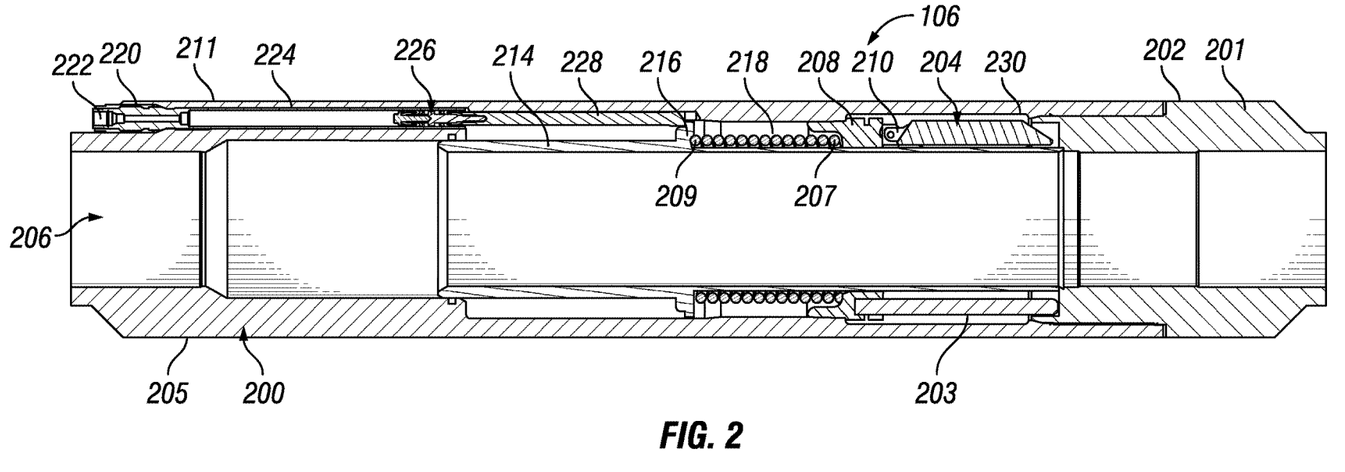
FIG. 2 illustrates an example of a safety valve in an open position.
Figure 3:
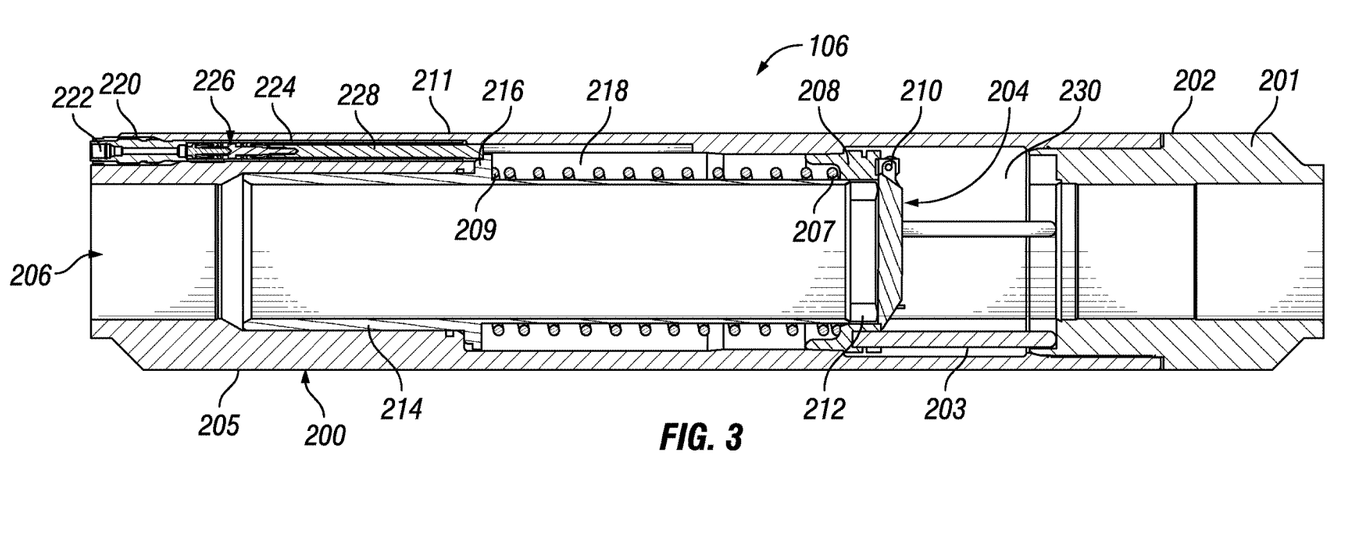
FIG. 3 illustrates an example of a safety valve in a closed position.
Figure 4:
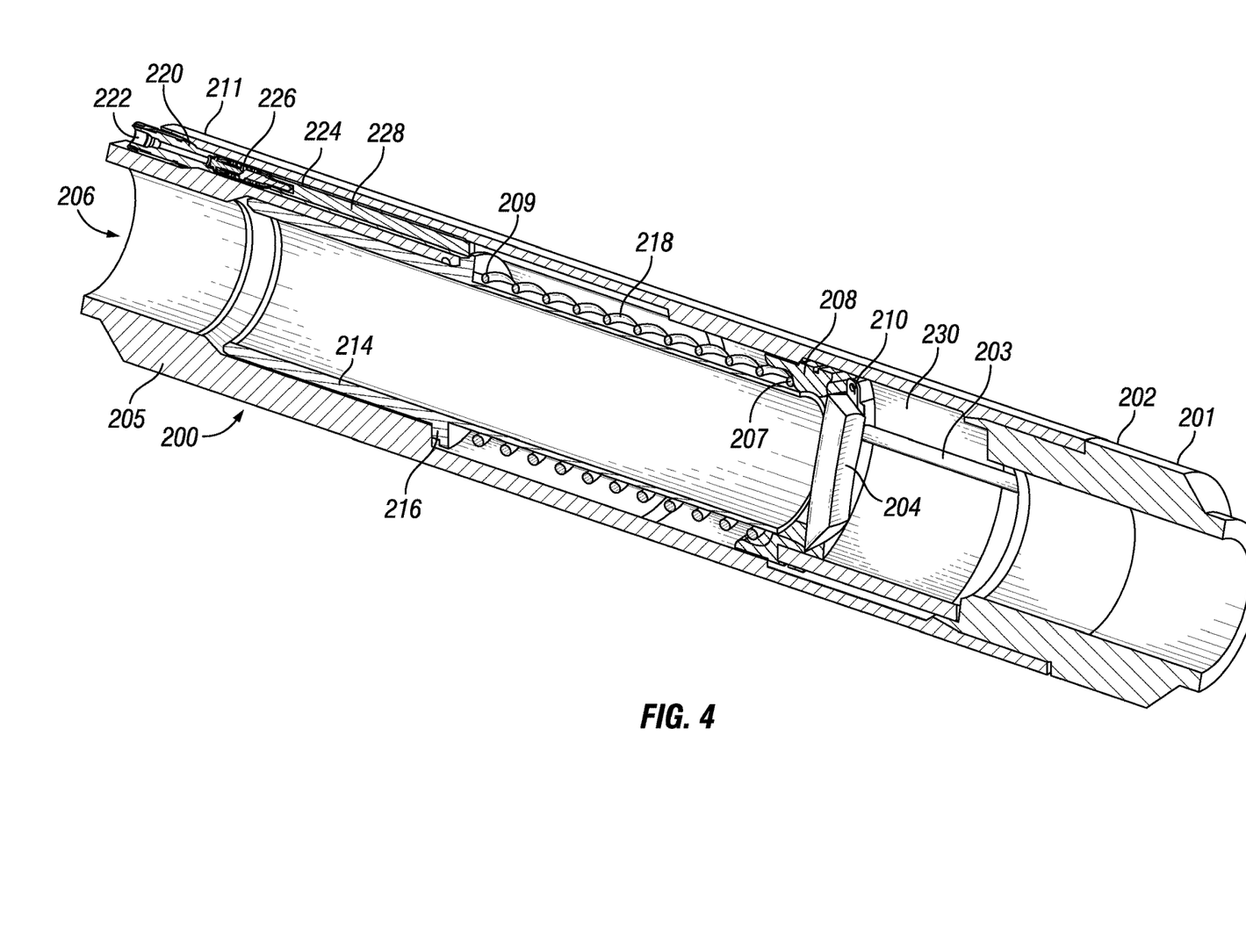
FIG. 4 illustrates an example of a safety valve in a closed position.

Referring to FIGS. 2-4, an example of safety valve 106 is shown in open and closed positions. FIG. 2 illustrates safety valve 106 in an open position. FIGS. 3 and 4 illustrate safety valve 106 in a closed position. Safety valve 106 may comprise a first sub assembly 200 and a second sub assembly 201. In examples, second sub assembly 201 may be conduit 110 (e.g., shown on FIG. 1) or may be an intermediate tubular connecting first sub assembly 200 to conduit 110. Second sub assembly 201 may comprise a rod 203. In examples, there may be a plurality of rods 203. Rods 203 may extend from second sub assembly 201 into first sub assembly 200 to secure certain tools and equipment (as discussed below).

First sub assembly 200 may comprise the internal components of safety valve 106 disposed within an outer housing 205 of first sub assembly 200. First sub assembly 200 may be affixed to an end 202 of second sub assembly 201, using any suitable mechanism, including, but not limited to, through the use of suitable fasteners, threading, adhesives, welding and/or any combination thereof. Without limitation, suitable fasteners may include nuts and bolts, washers, screws, pins, sockets, rods and studs, hinges and/or any combination thereof. First sub assembly 200 may comprise an outer housing 205. In examples, a central bore 206 may be formed through outer housing 205 that provides a flow path through first sub assembly 200.

In examples, a flapper valve 204 may be disposed into the central bore 206 of outer housing 205. Flapper valve 204 may selectively open and close central bore 206. In examples, central bore 206 may extend axially through first sub assembly 200. Although flapper valve 204 is depicted, note that any type of safety valve may be constructed to embody principles of the invention. Without limitation, flapper valve 204 may be another suitable valve member, such as a ball-type safety valve, or a sleeve-type safety valve, and others well known in the art. In examples, there may be a flapper assembly 208 that contains a hinge 210 that allows flapper valve 204 to rotate about a fixed point. Hinge 210 may be biased to force the flapper valve 204 to pivot to its open and/or closed position. Flapper assembly 208 may keep hinge 210 stationary in relation to first sub assembly 200. In examples, flapper assembly 208 may remain stationary by any suitable means. Flapper assembly 208 may further comprise a seat 212. Flapper valve 204 may rotate about hinge 210 to set against seat 212 to seal off central bore 206. Seat 212 may be any suitable size, height, and/or shape that accommodates flapper valve 204. Without limitation, a suitable shape may include, but is not limited to, cross-sectional shapes that are circular, elliptical, triangular, rectangular, square, hexagonal, and/or combinations thereof. Seat 212 may be made from any suitable material. Suitable materials may include, but are not limited to, metals, nonmetals, polymers, ceramics, and/or combinations thereof. In examples, the plurality of rods 203 of second sub assembly 201 may be disposed against seat 212 so as to prevent seat 212, and subsequently flapper assembly 208, from translating downwards.

An inner sleeve 214 may also be disposed in central bore 206 of outer housing 205. Inner sleeve 214 may align with the inner diameter of safety valve 106. Without limitation, inner sleeve 214 may be any suitable tubular. In examples, inner sleeve 214 may comprise a protrusion 216. Protrusion 216 may be a projection of material from inner sleeve 214 that projects into a receptacle (as discussed below) of outer housing 205. Protrusion 216 may be any suitable size, height, and/or shape. Without limitation, a suitable shape may include, but is not limited to, a cross-sectional shape that is circular, elliptical, triangular, rectangular, square, hexagonal, and/or combinations thereof. Protrusion 216 may be coupled to a first end 209 of a spring 218. A second end 207 of spring 218 may be coupled to flapper assembly 208. In examples, spring 218 may be disposed around inner sleeve 214. Spring 218 may be pre-conditioned to provide a tensile and/or compressive force against protrusion 216.

As illustrated, a receptacle 224 may be formed in outer housing 205. In the illustrated embodiment, receptacle 224 may be formed in outer wall 211 of outer housing 205. To protect internal components of safety valve 106 from an external environment, receptacle 224 may be sleeved. As illustrated, a sleeve 220 may be disposed in receptacle 224 of outer housing 205. Sleeve 220 may protect receptacle 224 from corrosion from well fluids approaching from central bore 206 and/or from a subterranean formation. In examples, sleeve 220 may be disposed in receptacle 224 through the use of any suitable mechanism. Without limitation, any suitable mechanism may include, but is not limited to, the use of suitable fasteners, threading, adhesives, welding and/or any combination thereof. Without limitation, suitable fasteners may include nuts and bolts, washers, screws, pins, sockets, rods and studs, hinges and/or any combination thereof.

A control line port 222 may be provided for connecting control line 102 (e.g., shown on FIG. 1) to safety valve 106. Control line port 222 may be formed in sleeve 220. When control line 102 is connected to control line port 222, control line 102 may be placed in fluid communication with a piston 226. Although piston 226 is depicted with a single rod 228 in FIGS. 2-4, it should be understood that any type and any number of pistons may be used, such as multiple rod pistons, or an annular piston, etc. In examples, piston 226 may be sealed against other components with non-elastomer dynamic seals (not shown). The lower side of piston 226 may be disposed about protrusion 216, and spring 218 may bias piston 226 upwardly.

A means of actuating spring 218 with piston 226 may be provided with protrusion 216. As piston 226, and subsequently rod 228, displaces downwards, rod 228 may push against protrusion 216. If the pressure supplied by control line 102 is greater than the upwardly biasing force of spring 218, protrusion 216 may displace downwards a given distance, thereby compressing spring 218. If the pressure supplied by control line 102 is less than the upwardly biasing force of spring 218, there may not be enough force to actuate protrusion 216 downwards to compress spring 218. If the pressure supplied by control line 102 is less than the upwardly biasing force of spring 218 while spring 218 is compressed, spring 218 may cause protrusion 216 to displace upwards, thereby displacing rod 228 upwards as well. As protrusion 216 is displaced, inner sleeve 214 may move in relation to the distance traveled by protrusion 216.

In examples, the operation of piston 226 may actuate flapper valve 204. As illustrated in FIG. 2, flapper valve 204 may be disposed in a cavity 230 formed by first sub assembly 200 and inner sleeve 214. This may be designated as the open position for safety valve 106 as flapper valve 204 is not obstructing the potential flow of material through central bore 206. As inner sleeve 214 displaces upwards and downwards within safety valve 106, the size and/or shape of cavity 230 may change. In examples, as the pressure applied to piston 226 reduces, spring 218 may expand axially and force protrusion 216 upwards. Inner sleeve 214 may displace upwards in accordance with the movement of protrusion 216. As inner sleeve 214 displaces upwards, a defining wall of cavity 230 may open up to allow flapper valve 204 to pivot to a closed position, as illustrated in FIGS. 3 and 4. In examples, a closed position of flapper valve 204 may be designated as when flapper valve 204 is perpendicular to central bore 206 and sets against seat 212, wherein flapper valve 204 prevents the flow of material through central bore 206. To actuate safety valve 106 from a closed position to an open position, pressure may be applied to piston 226 to move protrusion 216 and inner sleeve 214 downwards to compress spring 218, thereby causing flapper valve 204 to return to cavity 230 to allow material to flow through central bore 206.

Figure 5:
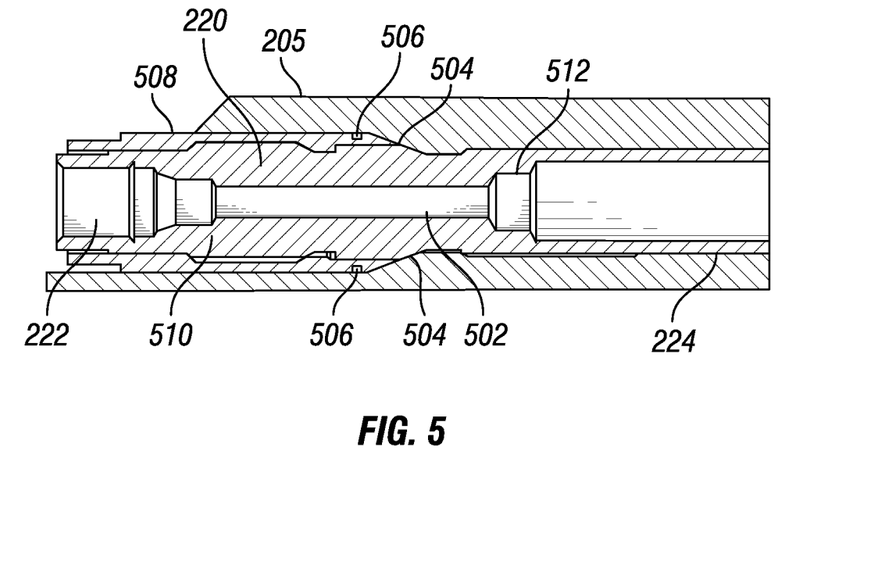
FIG. 5 illustrates an example of a sleeve.
Figure 6:
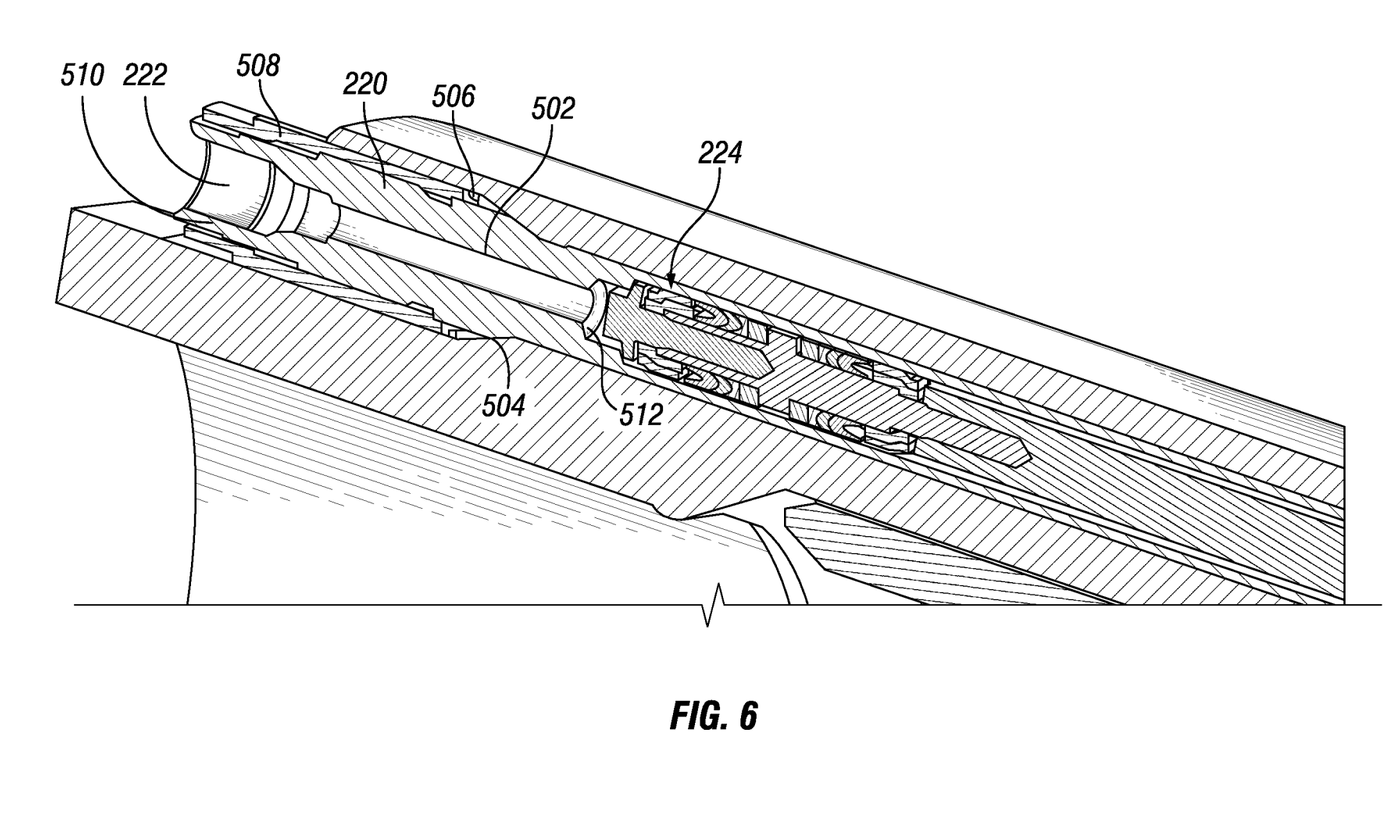
FIG. 6 illustrates an example of a sleeve.

FIGS. 5 and 6 illustrate close-up views of sleeve 220. Sleeve 220 may be any suitable size, height, and/or shape. Without limitation, a suitable shape may include, but is not limited to, cross-sectional shapes that are circular, elliptical, triangular, rectangular, square, hexagonal, and/or combinations thereof. Sleeve 220 may be made from any suitable material that is resistant to corrosion. Suitable materials may include, but are not limited to, metals, nonmetals, polymers, ceramics, and/or combinations thereof. In examples, sleeve 220 may be made from 410 stainless steel (SS), Inconel 925, Inconel 718, Inconel 945x, and/or combinations thereof. In examples, outer housing 205 may be made of a less corrosion resistant material than sleeve 220. Without limitation, outer housing 205 may be made from 4130 steel, 410 SS, Inconel 925, Inconel 718, and/or combinations thereof. In examples, sleeve 220 may be threaded into receptacle 224 of outer housing 205 to create a taper seal 504. A ferrule 506, or a plurality of ferrules 506, may be inserted into an annulus created between outer housing 205 and sleeve 220. A threaded nut 508 may be used to further secure sleeve 220 into outer housing 205. Disposing threaded nut around sleeve 220 and into the annulus created between sleeve 220 and outer housing 205 may cause the plurality of ferrules 506 to flare.

Sleeve 220 may further comprise a flow tube 502. Flow tube 502 may be a tubular connecting control line port 222 to piston 226 within sleeve 220. Flow tube 502 may be any suitable size, height, and/or shape. Without limitation, a suitable shape may include, but is not limited to, cross-sectional shapes that are circular, elliptical, triangular, rectangular, square, hexagonal, and/or combinations thereof. Flow tube 502 may be positioned at end 510 of sleeve 220 and have a reduced diameter with an extension portion 512 of sleeve 220 that extends from flow tube 502 towards piston 226.

Figure 7:
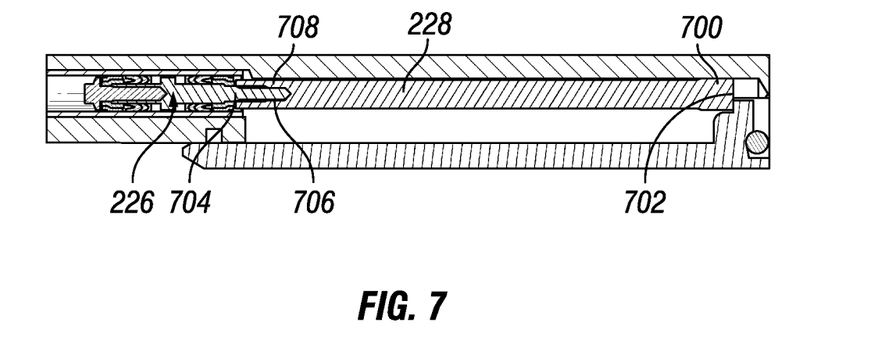
FIG. 7 illustrates an example of a constrained piston rod.

With reference to FIG. 7, a close-up view of piston 226 and rod 228 is depicted. In examples, pistons 226 having a smaller size may be beneficial for use in safety valve 106 (e.g., referring to FIG. 1) as the size of spring 218 (e.g., referring to FIGS. 2-4) could be reduced and/or the pressure supplied to close safety valve 106 could be increased. Without limitation, piston 226 may have a diameter of about ⅜ inches to about 1 inch. In such examples, buckling of rod 228 may occur. As illustrated, rod 228 may be constrained laterally, for example, as distal end 700 of rod 228 may be disposed in a pocket 702 formed at protrusion 216 from inner sleeve 214. As illustrated, the pocket 702 may be formed between protrusion 216 and outer housing 205. In examples, a portion of rod 228 may be secured to prevent twisting along a central axis of rod 228. For example, piston 226 may include a distal extension 704 that extends into a hole 706 formed at a proximal end 708 of rod 228. Concerning the present disclosure, an alignment rod and/or a spring bearing may not be necessary for operation of safety valve 106 as rod 228 is prevented from buckling and/or twisting. Further improvements from this design may include disposing flapper valve 204 (e.g., referring to FIGS. 2-4) further down along safety valve 106 in comparison to current TRSVs (e.g., an SP valve), reduced piston drag, longer life of piston 226, increased slam closure capability, and/or combinations thereof.

Figure 8A:
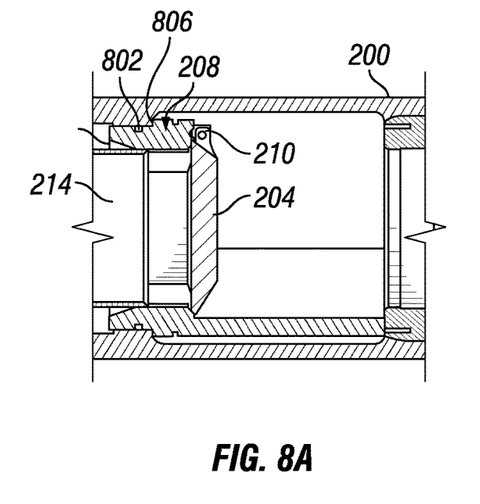
FIGS. 8A-8D illustrate examples of a flapper valve and seat assembly.
Figure 8B:
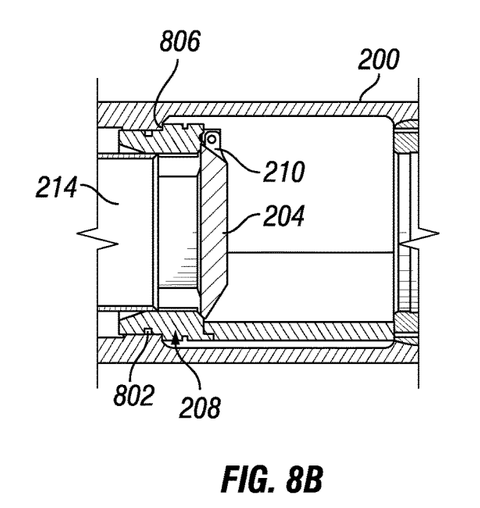

FIGS. 8A-8D illustrate various examples of flapper valve 204 in a closed position. As illustrated in FIG. 8A, flapper assembly 208 may extend as a singular piece to engage second sub assembly 201 (e.g., referring to FIGS. 2-4). Alternatively, flapper assembly 208 may extend as two separate pieces to engage second sub assembly 201. By fastening first sub assembly 200 to second sub assembly 201, flapper assembly 208 may be held in place. There may be seal grooves 802 on flapper assembly 208 designated for a seal (not illustrated). In examples, the seal grooves 802 comprising a seal may seal off a lower portion of safety valve 106 (e.g., referring to FIG. 1) from an upper portion of safety valve 106. Flapper assembly 208 may keep hinge 210 stationary in relation to first sub assembly 200 and inner sleeve 214. A taper seal 806 may be used in conjunction with seal grooves 802 to seal an upper portion of safety valve 106 from a lower portion of safety valve 106.

Figure 8C:
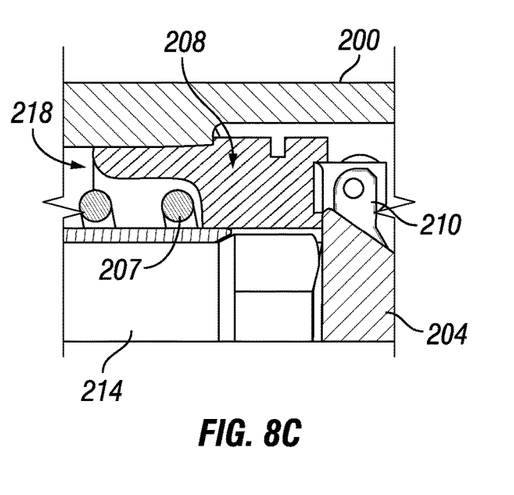
Figure 8D:
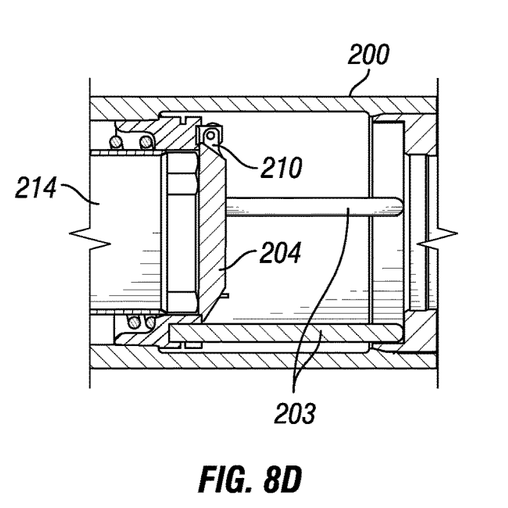

FIG. 8C illustrates an alternative example of flapper assembly 208. In this example, an interference fit may be used to keep flapper assembly 208 in place rather than an elastomeric and/or non-elastomeric seal such as taper seal 806. Further, a portion of flapper assembly 208 may be machined out in order to accommodate for second end 207 of spring 218. FIG. 8D illustrates an example of flapper assembly 208 being secured by the plurality of rods 203. Rods 203 may extend from second sub assembly 201 into first sub assembly 200 to and prevent the translation of flapper assembly 208.

Accordingly, this disclosure describes systems, methods, and apparatus that may relate to safety valves. The systems, methods, and apparatus may further be characterized by one or more of the following statements.

Statement 1. A safety valve, comprising: an outer housing having a central bore extending axially through the outer housing, wherein the outer housing comprises an outer wall having a receptacle formed in the outer wall; a sleeve disposed in the receptacle; a piston disposed in the sleeve, wherein the piston is actuated to travel in the sleeve; a spring positioned to apply a biasing force to the piston; and a valve member disposed in the outer housing, wherein the valve member is operable to selectively restrict flow through the safety valve in response to movement of the piston.

Statement 2. The safety valve of statement 1, wherein the valve member comprises a flapper valve.

Statement 3. The safety valve of statement 1 or 2, further comprising a rod, wherein the rod is disposed at an end of the piston.

Statement 4. The safety valve of statement 3, wherein a distal end of the rod is disposed in a pocket formed between the outer housing and a protrusion from an inner sleeve, wherein the inner sleeve is disposed in the central bore.

Statement 5. The safety valve of statement 3, wherein a distal extension of the piston extends into a hole at a proximal end of the rod.

Statement 6. The safety valve of statement 3, further comprising an inner sleeve disposed in the central bore of the outer housing, wherein the inner sleeve comprises a protrusion that is in engagement with an end of the spring, wherein the protrusion is disposed in a path of motion of the rod.

Statement 7. The safety valve of any of the previous statements, further comprising a seat, wherein the valve member comprises a flapper valve that is actuated to be disposed against the seat to seal off flow through the safety valve.

Statement 8. The safety valve of any of the previous statements, further comprising a control line port at a proximal end of the sleeve, wherein the sleeve comprises a flow tube of reduced diameter that provides fluid communication between the control line port and the piston.

Statement 9. The safety valve of any of the previous statements, further comprising a threaded nut at a proximal end of the receptacle, wherein the threaded nut engages the outer housing to secure the sleeve in the receptacle.

Statement 10. The safety valve of any of the previous statements, further comprising a first sub assembly comprising the outer housing and a second sub assembly threaded into the first sub assembly, wherein a rod extends from the second sub assembly to secure the valve member in the outer housing.

Statement 11. A method of actuating a safety valve, comprising: displacing a piston in a sleeve in response to a change in hydraulic pressure provided to the safety valve from a surface of a wellbore, wherein a receptacle is formed in an outer wall of an outer housing of the safety valve, wherein the sleeve is disposed in the receptacle; and actuating a valve member in response to the displacing the piston to restrict flow through the safety valve.

Statement 12. The method of statement 11, wherein the actuating the valve member comprises displacing a flapper valve to rotate about a hinge.

Statement 13. The method of statement 11 or 12, wherein a control line is connected to the safety valve, wherein the control line provides the hydraulic pressure to the safety valve.

Statement 14. The method of any of statements 11 to 13, wherein a decrease in the hydraulic pressure causes a spring to expand and exert a force against a rod in engagement with the piston to cause the piston to move through the sleeve.

Statement 15. The method of statement 14, wherein the spring engages an inner sleeve disposed in a central bore of the outer housing to displace the inner sleeve in the central bore, wherein the inner sleeve in turn engages the rod to cause displacement of the rod.

Statement 16. The method of statement 14, wherein a distal end of the rod is disposed in a pocket formed between a protrusion from an inner sleeve and the outer housing to constrain lateral movement of the rod.

Statement 17. A system for sealing a well, comprising: a control line; a production tubing; and a safety valve coupled to the production tubing, wherein the safety valve comprises: an outer housing having a central bore extending axially through the outer housing, wherein the outer housing comprises an outer wall having a receptacle formed in the outer wall, wherein the control line is coupled to the safety valve; a sleeve disposed in the receptacle; a piston disposed in the sleeve, wherein the piston is actuated to travel in the sleeve; a spring positioned to apply a biasing force to the piston; and a valve member disposed in the outer housing, wherein the valve member is operable to selectively restrict flow through the safety valve in response to movement of the piston.

Statement 18. The system of statement 17, wherein the valve member comprises a flapper valve.

Statement 19. The system of statement 17 or 18, further comprising a rod, wherein the rod is disposed at an end of the piston, wherein a distal end of the rod is disposed in a pocket formed between the outer housing and a protrusion from an inner sleeve, wherein the inner sleeve is disposed in the central bore.

Statement 20. The system of any of statements 17 to 19, further comprising a rod, wherein the rod is disposed at an end of the piston, wherein a distal extension of the piston extends into a hole at a proximal end of the rod.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A safety valve, comprising:
an outer housing having a central bore extending axially through the outer housing, wherein the outer housing comprises an outer wall having a receptacle formed in the outer wall;
a sleeve disposed in the receptacle;
a piston disposed in the sleeve, wherein the piston is actuated to travel in the sleeve;
a spring positioned to apply a biasing force to the piston;
a valve member disposed in the outer housing, wherein the valve member is operable to selectively restrict flow through the safety valve in response to movement of the piston, the valve member configured to restrict flow through the central bore upon expansion of the spring;
an inner sleeve disposed within the central bore of the outer housing, the inner sleeve operable to axially move to open or close the valve member upon expansion or compression of the spring; and
a first rod operable to contact the valve member to prevent translation of the valve member.

2. The safety valve of claim 1, wherein the valve member comprises a flapper valve.

3. The safety valve of claim 1, further comprising a second rod, wherein the second rod is disposed at an end of the piston.

4. The safety valve of claim 3, wherein a distal end of the second rod is disposed in a pocket formed between the outer housing and a protrusion from the inner sleeve.

5. The safety valve of claim 3, wherein a distal extension of the piston extends into a hole at a proximal end of the second rod.

6. The safety valve of claim 3, wherein the inner sleeve comprises a protrusion that is in engagement with an end of the spring, wherein the protrusion is disposed in a path of motion of the second rod.

7. The safety valve of claim 1, further comprising a seat, wherein the valve member comprises a flapper valve that is actuated to be disposed against the seat to seal off flow through the safety valve.

8. The safety valve of claim 1, further comprising a control line port at a proximal end of the sleeve, wherein the sleeve comprises a flow tube of reduced diameter that provides fluid communication between the control line port and the piston.

9. The safety valve of claim 1, further comprising a threaded nut at a proximal end of the receptacle, wherein the threaded nut engages the outer housing to secure the sleeve in the receptacle.

10. The safety valve of claim 1, further comprising a first sub assembly comprising the outer housing and a second sub assembly threaded into the first sub assembly.

11. A method of actuating a safety valve, comprising:
displacing a piston in a sleeve in response to a change in hydraulic pressure provided to the safety valve from a surface of a wellbore, wherein a receptacle is formed in an outer wall of an outer housing of the safety valve, wherein the sleeve is disposed in the receptacle;
axially moving an inner sleeve disposed within a central bore of the outer housing, in response to the displacing the piston;
actuating a valve member in response to axially moving the inner sleeve, the valve member configured to restrict flow through the central bore upon expansion of a spring; and
contacting the valve member with a first rod to prevent translation of the valve member.

12. The method of claim 11, wherein the actuating the valve member comprises displacing a flapper valve to rotate about a hinge.

13. The method of claim 11, wherein a control line is connected to the safety valve, wherein the control line provides the hydraulic pressure to the safety valve.

14. The method of claim 11, wherein a decrease in the hydraulic pressure causes the spring to expand and exert a force against a second rod in engagement with the piston to cause the piston to move through the sleeve.

15. The method of claim 14, wherein the spring engages the inner sleeve disposed in the central bore of the outer housing to displace the inner sleeve in the central bore, wherein the inner sleeve in turn engages the second rod to cause displacement of the second rod.

16. The method of claim 14, wherein a distal end of the second rod is disposed in a pocket formed between a protrusion from the inner sleeve and the outer housing to constrain lateral movement of the second rod.

17. A system for sealing a well, comprising:
a control line;
a production tubing; and
a safety valve coupled to the production tubing, wherein the safety valve comprises:
an outer housing having a central bore extending axially through the outer housing, wherein the outer housing comprises an outer wall having a receptacle formed in the outer wall, wherein the control line is coupled to the safety valve;
a sleeve disposed in the receptacle;
a piston disposed in the sleeve, wherein the piston is actuated to travel in the sleeve;
a spring positioned to apply a biasing force to the piston;
a valve member disposed in the outer housing, wherein the valve member is operable to selectively restrict flow through the safety valve in response to movement of the piston, the valve member configured to restrict flow through the central bore upon expansion of the spring; and
an inner sleeve disposed within the central bore of the outer housing, the inner sleeve operable to axially move to open or close the valve member upon expansion or compression of the spring; and
a first rod operable to contact the valve member to prevent translation of the valve member.

18. The system of claim 17, wherein the valve member comprises a flapper valve.

19. The system of claim 17, further comprising a second rod, wherein the second rod is disposed at an end of the piston, wherein a distal end of the second rod is disposed in a pocket formed between the outer housing and a protrusion from the inner sleeve.

20. The system of claim 17, further comprising a second rod, wherein the second rod is disposed at an end of the piston, wherein a distal extension of the piston extends into a hole at a proximal end of the second rod.

* * * * *